US011569008B1

(12) United States Patent
Grant et al.

(10) Patent No.: US 11,569,008 B1
(45) Date of Patent: Jan. 31, 2023

(54) CABLE WITH LOW MODE CONVERSION PERFORMANCE AND METHOD FOR MAKING THE SAME

(71) Applicant: DONGGUAN LUXSHARE TECHNOLOGIES CO., LTD, Dongguan (CN)

(72) Inventors: Charles Lloyd Grant, Dongguan (CN); Andrew John Nowak, Dongguan (CN); Jinchang Dai, Dongguan (CN); Bentao Hu, Dongguan (CN); Huanzhong Yan, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 0 days.

(21) Appl. No.: 17/701,485

(22) Filed: Mar. 22, 2022

Related U.S. Application Data

(63) Continuation-in-part of application No. 17/535,809, filed on Nov. 26, 2021.

(51) Int. Cl.
*H01B 11/18* (2006.01)
*H01B 11/20* (2006.01)
(Continued)

(52) U.S. Cl.
CPC ....... *H01B 11/1847* (2013.01); *H01B 7/0823* (2013.01); *H01B 11/002* (2013.01); *H01B 11/1091* (2013.01); *H01B 11/203* (2013.01)

(58) Field of Classification Search
CPC .. H01B 7/0216; H01B 7/0823; H01B 11/002; H01B 11/1847; H01B 11/203
See application file for complete search history.

(56) References Cited

U.S. PATENT DOCUMENTS 4,185,162 A * 1/1980 Bogese, II ........... H01B 7/0838 174/32
4,851,060 A * 7/1989 Wade, Jr. .............. H01F 41/122 428/378

(Continued)

FOREIGN PATENT DOCUMENTS

CN 213519296 U * 6/2021 ........... H01B 11/002

OTHER PUBLICATIONS

"High speed data cables", ParaLink® 50s Twinax high speed cables—LEONI, Nov. 24, 2021, 1 page, https:/Awww.leoni-data.com/en/products/copper-fiber-optic-cables/paralink-twinax-high-speed-cables/paralink-50s-twinax-high-speed-cables/.

*Primary Examiner* — Timothy J Thompson
*Assistant Examiner* — Rhadames Alonzo Miller
(74) *Attorney, Agent, or Firm* — Birch, Stewart, Kolasch & Birch, LLP

(57) ABSTRACT

A cable includes a first metal conductor, a first insulator, a second metal conductor and a second insulator. The first insulator includes a first arc-shaped surface. The second insulator includes a second arc-shaped surface. A distance between a central axis of the first metal conductor and a central axis of the second metal conductor is S. The first insulator and/or the second insulator are formed with a deformation surface at a position where the first insulator and the second insulator are in contact with each other. An outer diameter of a circle where the first arc-shaped surface is located and/or an outer diameter of a circle where the second arc-shaped surface is located is D, where S/D≤0.99. The cable of the present disclosure can achieve low mode conversion and improve high frequency characteristics.

18 Claims, 7 Drawing Sheets

(51) Int. Cl.
*H01B 7/08* (2006.01)
*H01B 11/00* (2006.01)
*H01B 11/10* (2006.01)

(56) References Cited

U.S. PATENT DOCUMENTS

| | | | | |
|---|---|---|---|---|
| 6,395,975 | B1 * | 5/2002 | Bosisio | H01B 9/0611 174/120 SC |
| 6,677,518 | B2 * | 1/2004 | Hirakawa | H01B 11/1091 174/36 |
| 7,790,981 | B2 | 9/2010 | Vaupotic et al. | |
| 8,981,216 | B2 | 3/2015 | Grant et al. | |
| 9,136,042 | B2 * | 9/2015 | Sugiyama | H01B 13/00 |
| 9,660,318 | B2 | 5/2017 | Sugiyama et al. | |
| 9,741,469 | B2 | 8/2017 | Janssen et al. | |
| 10,381,136 | B2 * | 8/2019 | Grant | H01B 11/1066 |
| 10,964,448 | B1 * | 3/2021 | Wright | H01B 3/421 |
| 2003/0150633 | A1 * | 8/2003 | Hirakawa | H01B 11/002 174/36 |
| 2006/0237221 | A1 * | 10/2006 | Glew | H01B 11/06 174/146 |
| 2006/0263512 | A1 * | 11/2006 | Glocker | G01R 33/286 427/2.25 |
| 2011/0247856 | A1 * | 10/2011 | Matsuda | H01B 11/203 174/108 |
| 2012/0090873 | A1 * | 4/2012 | Gundel | H01B 11/1895 174/113 R |
| 2012/0090874 | A1 * | 4/2012 | Pagliuca | B32B 27/08 174/120 SR |
| 2013/0146326 | A1 * | 6/2013 | Gundel | H01B 11/005 174/102 R |
| 2014/0182881 | A1 * | 7/2014 | Huang | H01B 11/1091 174/103 |
| 2015/0031546 | A1 * | 1/2015 | Yagi | H01B 7/0241 505/230 |
| 2015/0294760 | A1 * | 10/2015 | Gundel | H01B 11/002 174/102 R |
| 2016/0343474 | A1 * | 11/2016 | Nichols | H01B 11/1891 |
| 2018/0075948 | A1 * | 3/2018 | Kobayashi | H01B 11/20 |
| 2018/0102204 | A1 * | 4/2018 | Li | H01B 7/17 |
| 2018/0158574 | A1 * | 6/2018 | Dai | H01B 11/1856 |
| 2018/0286536 | A1 * | 10/2018 | Hazenfield | H01B 7/295 |
| 2019/0009512 | A1 * | 1/2019 | Kagawa | B32B 37/203 |
| 2019/0096542 | A1 * | 3/2019 | Huang | H01B 7/0838 |
| 2019/0172611 | A1 * | 6/2019 | Sugiyama | H01B 7/0216 |
| 2019/0198199 | A1 * | 6/2019 | Gundel | H01B 7/0838 |
| 2019/0318841 | A1 * | 10/2019 | Hornung | H01B 11/002 |
| 2020/0126693 | A1 * | 4/2020 | Farkas | H01B 11/1091 |
| 2020/0185124 | A1 * | 6/2020 | Yang | H01B 7/0861 |
| 2021/0098157 | A1 * | 4/2021 | Cai | H01B 1/02 |
| 2021/0098158 | A1 * | 4/2021 | Zheng | H01B 11/002 |

* cited by examiner

CABLE WITH LOW MODE CONVERSION PERFORMANCE AND METHOD FOR MAKING THE SAME

CROSS REFERENCE TO RELATED APPLICATION

This application is a continuation-in-part of U.S. patent application Ser. No. 17/535,809, filed Nov. 26, 2021 and titled "CABLE WITH LOW MODE CONVERSION PERFORMANCE", which is hereby incorporated by reference in its entirety.

TECHNICAL FIELD

The present disclosure relates to a cable and a method for making the cable, which belongs to a technical field of cable connectors and manufacturing method.

BACKGROUND

A twin-axial cable with a shielding layer extending in a longitudinal direction is usually adapted to transmit high-speed differential signals with a data rate of 25 Gb/s and above. An important performance parameter of high-speed differential cables is mode conversion, which is also known as s-parameter, SCD21. This is a measurement of the amount of differential signals converted to common mode signals. The common mode signals add noise to the transmitted data, thereby reducing system performance. Cable structures in the prior art easily lead to unbalance of the differential pair, which leads to higher mode conversion.

Twinaxial cable manufacturing in the existing art typically uses two individually insulated round conductors to form a twinaxial pair. Industry standard manufacturing processes minimize tensions and the effect of dies to ensure the insulated conductors are not deformed and retain their round shape.

However, the distance between twinaxial cables in the prior art is large, which easily leads to unbalance of the differential pair, resulting in higher mode conversion.

SUMMARY

An object of the present disclosure is to provide a cable which is capable of realizing low mode conversion, and a method for making the cable.

In order to achieve the above object, the present disclosure adopts the following technical solution: a cable, including: a first metal conductor, adapted to transmit a first signal; a first insulator, at least partially wrapped on the first metal conductor, the first insulator extending along a longitudinal direction; a second metal conductor, adapted to transmit a second signal; a second insulator, at least partially wrapped on the second metal conductor, the second insulator extending along the longitudinal direction; wherein a distance between a central axis of the first metal conductor and a central axis of the second metal conductor is S; the first insulator and the second insulator are arranged side by side along a width direction perpendicular to the longitudinal direction; the first insulator and the second insulator are adjacent to and in contact with each other; the first insulator includes a first arc-shaped surface, the second insulator includes a second arc-shaped surface; at a position where the first insulator and the second insulator are in contact with each other, the first insulator and/or the second insulator are provided with a deformation surface; an outer diameter of a circle where the first arc-shaped surface is located and/or an outer diameter of a circle where the second arc-shaped surface is located is D, where S/D≤0.99.

In order to achieve the above object, the present disclosure adopts the following technical solution: a method of manufacturing a cable, including steps of: S1: providing a first metal conductor, the first metal conductor being adapted to transmit a first signal; S2: providing a first insulator, the first insulator being at least partially wrapped on the first metal conductor, the first insulator extending along a longitudinal direction; S3: providing a second metal conductor, the second metal conductor being adapted to transmit a second signal; S4: providing a second insulator, the second insulator being at least partially wrapped around the second metal conductor, the second insulator extending along the longitudinal direction; and S5: providing an intermediate layer material, the intermediate layer material being at least partially wound on the first insulator and the second insulator, so that the first insulator and the second insulator are pressed against each other; the first insulator including a first arc-shaped surface, the second insulator including a second arc-shaped surface; at a position where the first insulator and the second insulator are in contact with each other, the first insulator and/or the second insulator are formed with a deformation surface; a distance between a central axis of the first metal conductor and a central axis of the second metal conductor is S; an outer diameter of a circle where the first arc-shaped surface is located and/or an outer diameter of a circle where the second arc-shaped surface is located is D, where S/D≤0.99.

Compared with the prior art, in the cable of the present disclosure, at the position where the first insulator and the second insulator are in contact with each other, the first insulator and/or the second insulator are formed with a deformation surface. By making S/D≤0.99, the distance between the first metal conductor and the second metal conductor is shortened, so that the cable of the present disclosure can achieve low mode conversion and improve high frequency characteristics.

DETAILED DESCRIPTION

Figure 1:
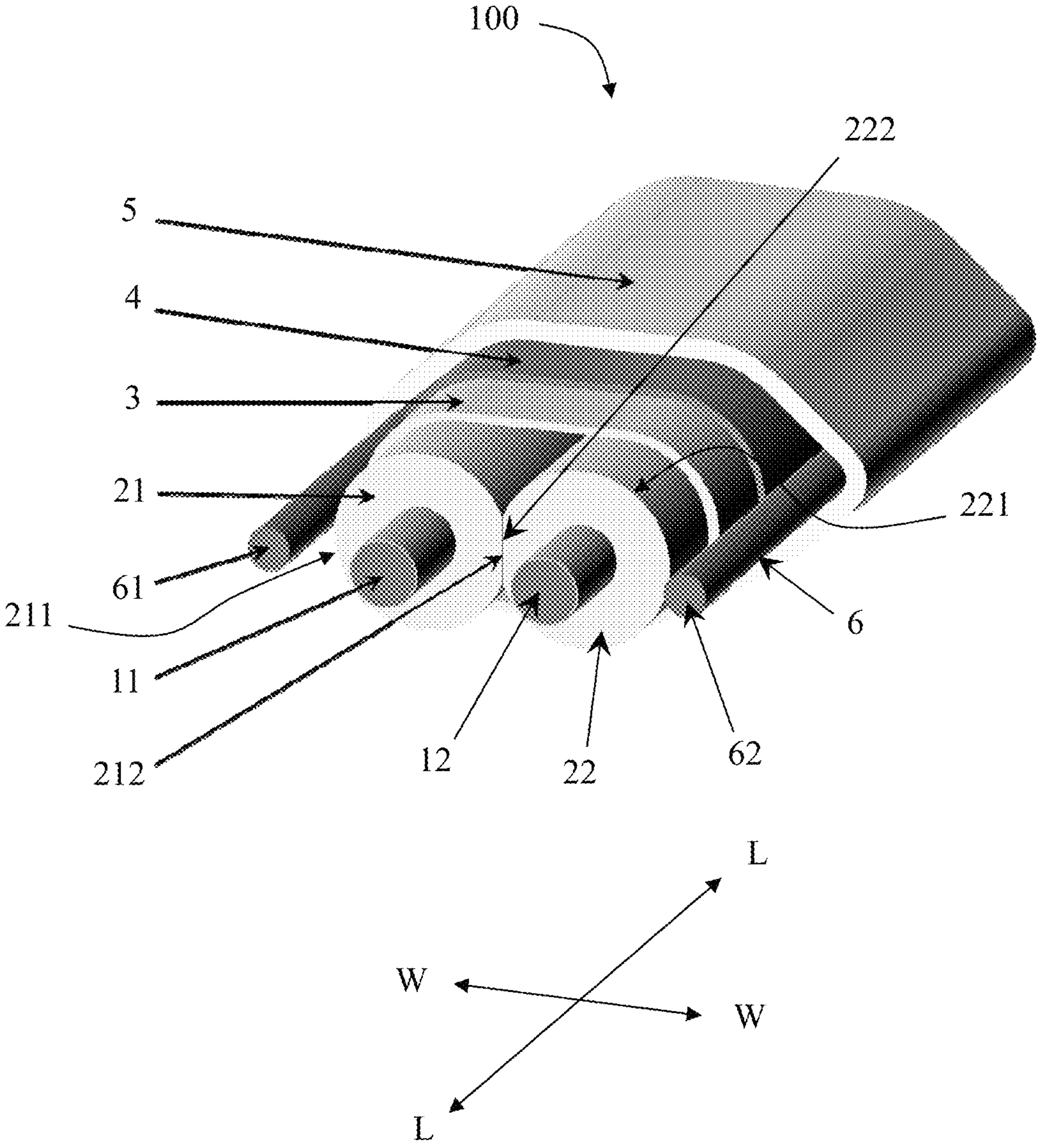
FIG. 1 is a schematic perspective view of a cable in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 4, the present disclosure discloses a cable 100 including a first metal conductor 11, a first insulator 21 at least partially wrapped on the first metal conductor 11, a second metal conductor 12, a second insulator 22 at least partially wrapped on the second metal conductor 12, an intermediate layer material 3 at least partially wound on the first insulator 21 and the second insulator 22, a shielding layer 4 at least partially wrapped on the intermediate layer material 3, and an insulating skin 5 at least partially wrapped on the shielding layer 4.

In an embodiment illustrated in the present disclosure, the first metal conductor 11 and the second metal conductor 12 are of cylindrical configurations. The first metal conductor 11 is adapted to transmit a first signal, and the second metal conductor 12 is adapted to transmit a second signal. In one embodiment of the present disclosure, the first signal and the second signal form a high-speed differential pair. In one embodiment of the present disclosure, the first metal conductor 11 and the second metal conductor 12 are silver-plated copper wires so as to improve the quality of signal transmission.

Referring to FIGS. 1 to 4, in an embodiment of the present disclosure, the first insulator 21 and the second insulator 22 both extend along a longitudinal direction L-L. The first insulator 21 and the second insulator 22 are adjacent to, parallel to, and in contact with each other. The first insulator 21 and the second insulator 22 are arranged side by side along a width direction W-W perpendicular to the longitudinal direction L-L. Both the first insulator 21 and the second insulator 22 are substantially cylindrical. In other words, outer contours of the first insulator 21 and the second insulator 22 are not absolute round circles.

At a position where the first insulator 21 and the second insulator 22 are in contact with each other, the first insulator 21 and/or the second insulator 22 are formed with a deformation surface/extrusion surface. In the illustrated embodiment of the present disclosure, the first insulator 21 includes a first arc-shaped surface 211, and the second insulator 22 includes a second arc-shaped surface 221. The deformation surface is a flat surface. The deformation surface includes a first flat surface 212 formed on the first insulator 21 and a second flat surface 222 formed on the second insulator 22. The first flat surface 212 and the second flat surface 222 are pressed surfaces. The first flat surface 212 and the second flat surface 222 are pressed against each other. The first arc-shaped surface 211 is a superior arc. The first arc-shaped surface 211 and the first flat surface 212 together form an outer surface of the first insulator 21. The second arc-shaped surface 221 is a superior arc. The second arc-shaped surface 221 and the second flat surface 222 together form an outer surface of the second insulator 22.

Of course, in other embodiments, the deformation surface may also be formed only on one of the first insulator 21 and the second insulator 22.

Figure 2:
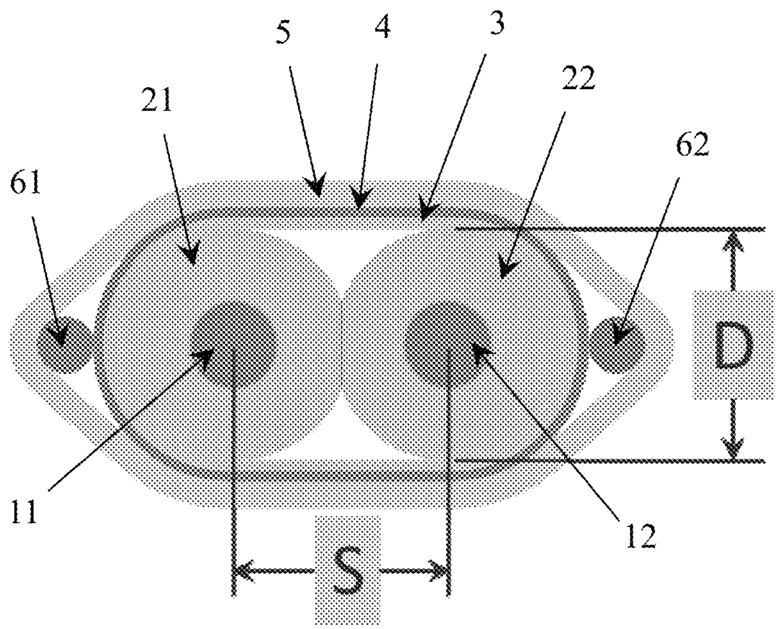
FIG. 2 is a front view of FIG. 1.
Figure 3:
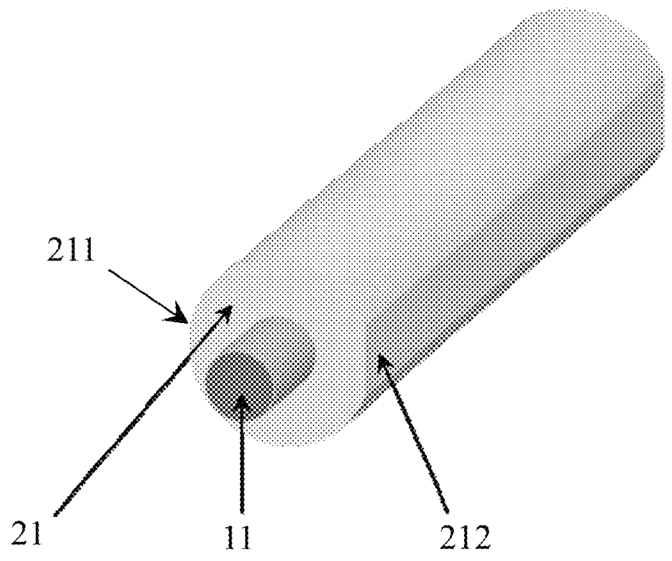
FIG. 3 is a perspective schematic view when a first insulator in FIG. 1 is wrapped on a first metal conductor.

Referring to FIG. 2, a distance between a central axis of the first metal conductor 11 and a central axis of the second metal conductor 12 is S. An outer diameter of a circle where the first arc-shaped surface 211 is located and/or an outer diameter of a circle where the second arc-shaped surface 221 is located is D, where $S/D \leq 0.99$. The first flat surface 212 is located inside the circle where the first arc-shaped surface 211 is located, that is, the first flat surface 212 is in a retracted shape. The second flat surface 222 is located inside the circle where the second arc-shaped surface 221 is located, that is, the second flat surface 222 is in a retracted shape as well.

In an embodiment of the present disclosure, the outer diameter of the circle where the first arc-shaped surface 211 is located and the outer diameter of the circle where the second arc-shaped surface 221 is located are both D. The first insulator 21 and the second insulator 22 are arranged symmetrically.

In an embodiment of the present disclosure, the first insulator 21 and the second insulator 22 are standard cylindrical shapes during initial manufacturing, that is, outer contours of the first insulator 21 and the second insulator 22 are standard round circles. In the subsequent manufacturing process, both the first insulator 21 and the second insulator 22 are deformed by extruding the first insulator 21 and the second insulator 22 to form the first flat surface 212 and the second flat surface 222.

Figure 4:
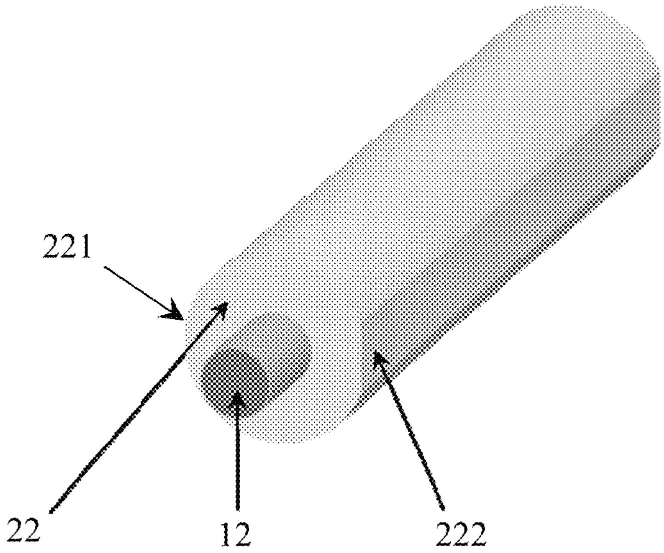
FIG. 4 is a perspective view of a second insulator wrapped on a second metal conductor and at another angle.
Figure 5:
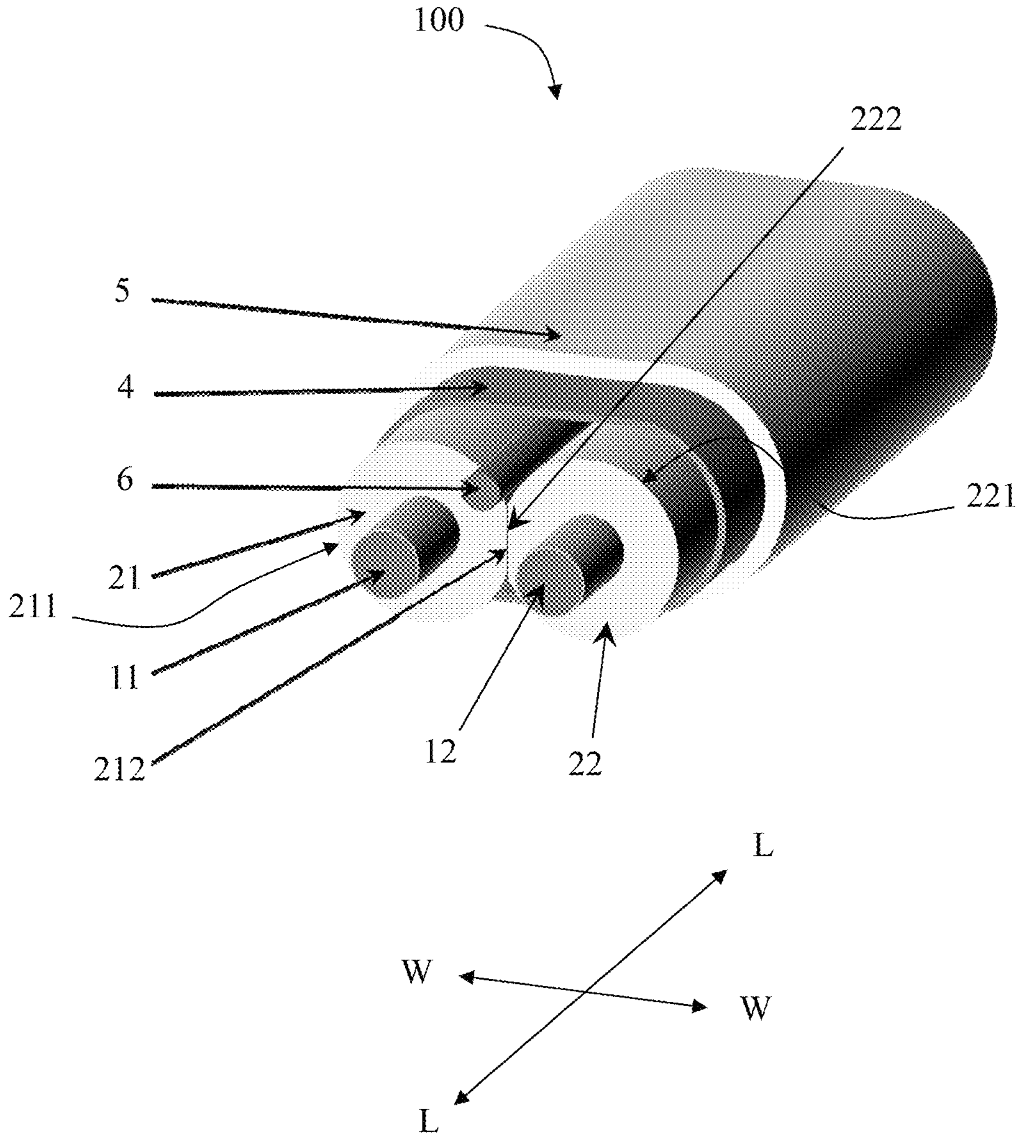
FIG. 5 is a schematic perspective view of a cable in accordance with another embodiment of the present disclosure.

Of course, in another embodiment of the present disclosure, the first insulator 21 and the second insulator 22 may also have the shapes shown in FIG. 4 and FIG. 5, respectively, after manufacture. During assembly, the first flat surface 212 and the second flat surface 222 are directly abutted together.

In an embodiment of the present disclosure, the first insulator 21 is polyolefin or fluoropolymer, and the second insulator 21 is polyolefin or fluoropolymer. Materials of the first insulator 21 and the second insulator 21 may be the same or different. The intermediate layer material 3 is a buffer insulating layer wound around or sleeved outside the first insulator 21 and the second insulator 21. The intermediate layer material 3 has functions of insulating and buffering.

In an embodiment of the present disclosure, a dielectric constant of the intermediate layer material 3 is lower than a dielectric constant of the first insulator 21. The dielectric constant of the intermediate layer material 3 is lower than a dielectric constant of the second insulator 22. With this arrangement, the cable 100 of the present disclosure can realize low mode conversion, thereby improving high frequency characteristics. In an embodiment of the present disclosure, the intermediate layer material 3 is made of foam polyolefin. The intermediate layer material 3 is helically wound on the first insulator 21 and the second insulator 22 along the longitudinal direction L-L of the cable 100. Specifically, the intermediate layer material 3 is wound on the first insulator 21 and the second insulator 22 along the longitudinal direction L-L of the cable 100 in a continuous manner.

In an embodiment of the present disclosure, the shielding layer 4 is a metal material (for example, aluminum) or a mixed material of metal and plastic (for example, a mixed material of aluminum and polyester). The shielding layer 4 may have one layer or multiple layers.

In an embodiment of the present disclosure, the insulating skin 5 may be made of polyester material.

The cable 100 further includes at least one drain wire 6. Referring to FIGS. 1 to 4, in an embodiment of the present disclosure, the at least one drain wire 6 includes a first drain wire 61 and a second drain wire 62 located on opposite sides of the first metal conductor 11 and the second metal conductor 12, respectively. The first drain wire 61 and the second drain wire 62 are both located between the shielding layer 4 and the insulating skin 5. The first drain wire 61 and the second drain wire 62 are both tin-plated copper wires. Of course, in other embodiments, the first drain wire 61 and the second drain wire 62 may be arranged in other positions of the cable 100.

Referring to FIG. 5, in another embodiment shown in the present disclosure, there is only one drain wire 6, and the cable 100 is not provided with the intermediate layer material 3. The drain wire 6 is located inside the shielding layer 4, and the drain wire 6 is located outside the first metal conductor 11 and the second metal conductor 12.

Figure 6:
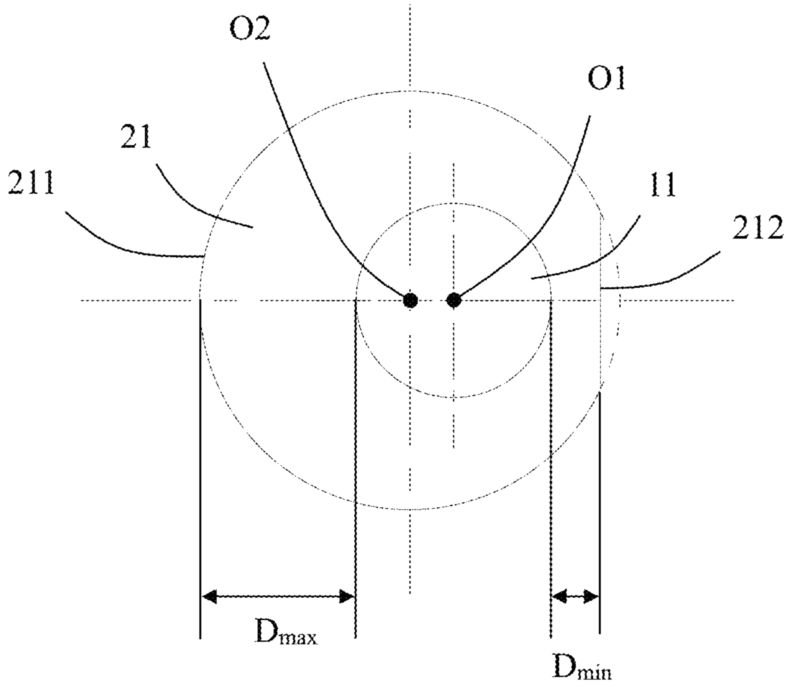
FIG. 6 is a schematic view when a conductor and an insulator are eccentric.

As shown in FIG. 6, one of the reasons for the mode conversion in the cable is that the position of a metal conductor is not in a center of a corresponding insulator. Taking the first metal conductor 11 and the first insulator 21 as an example, due to manufacturing reasons, a center 01 of the first metal conductor 11 deviates from a center 02 of the first insulator 21, that is, the coaxiality of the two is not 100%. The calculation formula of the coaxiality is as follows: coaxiality=$D_{max}/D_{min}$*100%, where $D_{max}$ represents a maximum distance between the first metal conductor 11 and the first insulator 21 on the same side, $D_{min}$ represents a minimum distance between the first metal conductor 11 and the first insulator 21 on the same side. In the manufacture of cables, the qualified coaxiality can generally be considered as no less than 95%.

With reference to FIG. 2, it can be understood that if the outer contours of the first insulator 21 and the second insulator 22 are standard round circles, S/D=1. In the embodiment shown in the present disclosure, by setting the deformation surface, S/D≤0.99. That is, the distance between the first metal conductor 11 and the second metal conductor 12 is shortened. By bringing the first metal conductor 11 and the second metal conductor 12 closer to each other, mode conversion is reduced.

Figure 7:
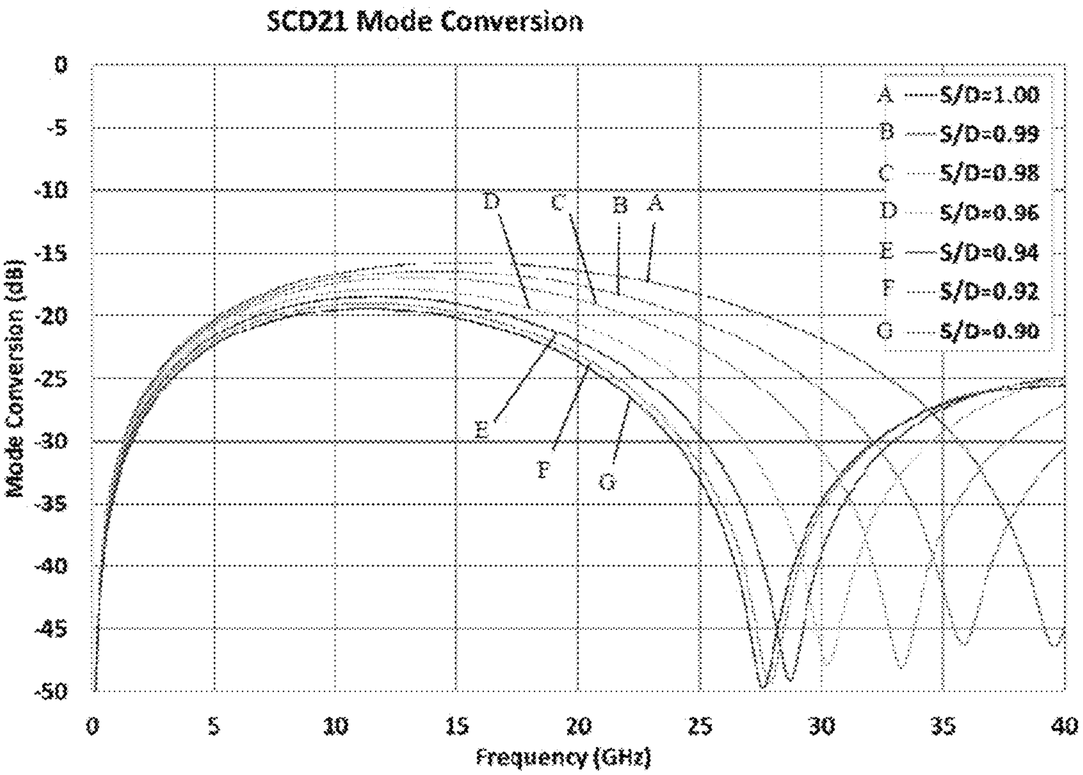
FIG. 7 is a comparison diagram of test mode conversion of the cable of the present disclosure when the coaxiality is 95% and S/D is 1.00, 0.99, 0.98, 0.96, 0.94, 0.92, and 0.90, respectively.

Referring to FIG. 7, the present disclosure takes the worst case coaxiality of 95% as an example to test the mode conversion level, where the abscissa in FIG. 7 represents the frequency (unit: GHz), the ordinate represents the mode conversion (unit: dB), curves A to G represent the test results of the cable 100 in the embodiment of the present disclosure. The curve A represents the test result when S/D=1.00. Curve B represents the test results when S/D=0.99. Curve C represents the test results when S/D=0.98. Curve D represents the test results when S/D=0.96. Curve E represents the test results when S/D=0.94. Curve F represents the test results when S/D=0.92. Curve G represents the test results when S/D=0.90. As can be seen from FIG. 7, compared with S/D=1.00, by making S/D≤0.99, the cable 100 of the present disclosure has lower mode conversion, so that it has better high frequency characteristics.

The present disclosure also discloses a method for manufacturing the cable 100, which includes the following steps:

S1: providing a first metal conductor 11, the first metal conductor 11 being adapted to transmit a first signal;

S2: providing a first insulator 21, the first insulator 21 being at least partially wrapped on the first metal conductor 11, the first insulator 21 extending along a longitudinal direction L-L, the first insulator 21 including a first arc-shaped surface;

S3: providing a second metal conductor 12, the second metal conductor 12 being adapted for transmitting a second signal;

S4: providing a second insulator 22, the second insulator 22 being at least partially wrapped around the second metal conductor 12, the second insulator 22 extending along the longitudinal direction L-L, the second insulator 22 including a second arc-shaped surface; and S5: providing an intermediate layer material 3, the intermediate layer material 3 being at least partially wound on the first insulator 21 and the second insulator 22 so that the first insulator 21 and the second insulator 22 are pressed against each other; at a position where the first insulator 21 and the second insulator 22 are in contact with each other, the first insulator 21 and/or the second insulator 22 are formed with a deformation surface; a distance between a central axis of the first metal conductor 11 and a central axis of the second metal conductor 12 is S; an outer diameter of a circle where the first arc-shaped surface is located and/or an outer diameter of a circle where the second arc-shaped surface is located is D, where S/D≤0.99.

In step S2,the first insulator 21 is cylindrical. In step S4, the second insulator 22 is also cylindrical. In step S5, the intermediate layer material 3 is helically wound on the first insulator 21 and the second insulator 22 along the longitudinal direction L-L. For example, the present disclosure may utilize a helically wound tape (i.e., the intermediate layer material 3) applied with high tension or alternate forming dies, at a location where the first insulator 21 and the second insulator 22 are in contact with each other, to deform the cylindrical first insulator 21 and the cylindrical second insulator 22. This deformation causes the first metal conductor 11 and the second metal conductor 12 to be more closely spaced than when the first insulator 21 and the second insulator 22 retain their cylindrical shapes. By making the first metal conductor 11 and the second metal conductor 12 closer, the mode conversion is reduced.

In the embodiment shown in the present disclosure, in step S5, both the first insulator 21 and the second insulator 22 are deformed. The deformation surface includes a first flat surface formed on the first insulator 21 and a second flat surface formed on the second insulator 22. The first flat surface and the second flat surface are pressed against each other.

In the present disclosure, by providing the intermediate layer material 3 and winding the first insulator 21 and the second insulator 22 through the intermediate layer material 3, on one hand, it is beneficial to bundle the first insulator 21 and the second insulator 22 tightly, so that the distance between the first metal conductor 11 and the second metal conductor 12 is smaller; on the other hand, the cylindrical first insulator 21 and the cylindrical second insulator 22 can be manufactured by using an existing mold, without adding additional molds, thereby saving costs.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A cable, comprising:

a first metal conductor, adapted to transmit a first signal;

a first insulator, at least partially wrapped on the first metal conductor, the first insulator extending along a longitudinal direction;

a second metal conductor, adapted to transmit a second signal; and a second insulator, at least partially wrapped on the second metal conductor, the second insulator extending along the longitudinal direction;

wherein a distance between a central axis of the first metal conductor and a central axis of the second metal conductor is S; and wherein the first insulator and the second insulator are arranged side by side along a width direction perpendicular to the longitudinal direction; the first insulator and the second insulator are adjacent to and in contact with each other; the first insulator comprises a first arc-shaped surface, the second insulator comprises a second arc-shaped surface; at a position where the first insulator and the second insulator are in contact with each other, the first insulator and/or the second insulator are provided with a deformation surface; an outer diameter of a circle where the first arc-shaped surface is located and/or an outer diameter of a circle where the second arc-shaped surface is located is D, where $S/D \leq 0.99$.

2. The cable according to claim 1, wherein the deformation surface is a flat surface.

3. The cable according to claim 1, wherein the deformation surface comprises a first flat surface formed on the first insulator and a second flat surface formed on the second insulator, the first flat surface and the second flat surface are against each other.

4. The cable according to claim 3, wherein the first flat surface and the second flat surface are pressed surfaces.

5. The cable according to claim 3, wherein the first flat surface is located inside the circle where the first arc-shaped surface is located, and the second flat surface is located inside the circle where the second arc-shaped surface is located.

6. The cable according to claim 1, wherein the outer diameter of the circle where the first arc-shaped surface is located and the outer diameter of the circle where the second arc-shaped surface is located are both D.

7. The cable according to claim 1, wherein the first insulator and the second insulator are arranged symmetrically.

8. The cable according to claim 1, further comprising an intermediate layer material, and the intermediate layer material is at least partially wound on the first insulator and the second insulator.

9. The cable according to claim 8, wherein a dielectric constant of the intermediate layer material is lower than a dielectric constant of the first insulator, and the dielectric constant of the intermediate layer material is lower than a dielectric constant of the second insulator.

10. The cable according to claim 8, wherein the intermediate layer material is helically wound on the first insulator and the second insulator along the longitudinal direction.

11. The cable according to claim 1, wherein the first metal conductor and the second metal conductor are both silver-plated copper wires.

12. The cable according to claim 1, wherein the first insulator is polyolefin or fluoropolymer, and the second insulator is polyolefin or fluoropolymer.

13. The cable according to claim 1, further comprising a shielding layer at least partially wrapped around the first insulator and the second insulator, and an insulating skin at least partially wrapped on the shielding layer; wherein the shielding layer is made of a metal material or a mixed material of metal and plastic.

14. The cable according to claim 13, further comprising at least one drain wire, the at least one drain wire is located inside the shielding layer or the insulating skin, and the at least one drain wire is located outside the first metal conductor and the second metal conductor; wherein the at least one drain wire is a tinned copper wire.

15. A method of manufacturing a cable, comprising steps of:

S1: providing a first metal conductor, the first metal conductor being adapted to transmit a first signal;

S2: providing a first insulator, the first insulator being at least partially wrapped on the first metal conductor, the first insulator extending along a longitudinal direction;

S3: providing a second metal conductor, the second metal conductor being adapted to transmit a second signal;

S4: providing a second insulator, the second insulator being at least partially wrapped around the second metal conductor, the second insulator extending along the longitudinal direction; and S5: providing an intermediate layer material, the intermediate layer material being at least partially wound on the first insulator and the second insulator, so that the first insulator and the second insulator are pressed against each other; the first insulator comprising a first arc-shaped surface, the second insulator comprising a second arc-shaped surface; at a position where the first insulator and the second insulator are in contact with each other, the first insulator and/or the second insulator are formed with a deformation surface; a distance between a central axis of the first metal conductor and a central axis of the second metal conductor is S; an outer diameter of a circle where the first arc-shaped surface is located and/or an outer diameter of a circle where the second arc-shaped surface is located is D, where $S/D \leq 0.99$.

16. The method according to claim 15, wherein in step S2, the first insulator is cylindrical; and wherein in step S4, the second insulator is also cylindrical.

17. The method according to claim 15, wherein in step S5, the intermediate layer material is helically wound on the first insulator and the second insulator along the longitudinal direction.

18. The method according to claim 15, wherein in step S5, both the first insulator and the second insulator are deformed; the deformation surface comprises a first flat surface formed on the first insulator and a second flat surface formed on the second insulator; and the first flat surface and the second flat surface are pressed against each other.

* * * * *